United States Patent [19]
Yu

[11] Patent Number: 5,294,167
[45] Date of Patent: Mar. 15, 1994

[54] AUTOMOBILE COVERING DEVICE

[76] Inventor: Ming-Hui Yu, 3F, No. 692-4, Chung-Cheng Rd., Hsin-Chuang City, Taipei Hsien, Taiwan

[21] Appl. No.: 986,981

[22] Filed: Dec. 8, 1992

[51] Int. Cl.⁵ .............................................. B60J 11/00
[52] U.S. Cl. ..................................... 296/98; 296/136; 160/24; 160/243; 242/94
[58] Field of Search ............... 296/98, 136; 160/24, 160/243; 242/86.5 R, 94; 150/166, 168

[56] References Cited

U.S. PATENT DOCUMENTS

| | | | |
|---|---|---|---|
| 3,680,807 | 8/1972 | Fortson | 242/92 |
| 4,718,711 | 1/1988 | Rabbit | 296/136 |

FOREIGN PATENT DOCUMENTS 1074987  10/1954  France ............................ 296/136

*Primary Examiner*—Dennis H. Pedder
*Attorney, Agent, or Firm*—Ladas & Parry

[57] ABSTRACT

An automobile covering device includes a hollow cylindrical member having two closed ends, an axial slot and a water outlet. A U-shaped handle has two ends connected pivotally to the two closed ends of the cylindrical member. A cylinder with an axial shaft is received coaxially and rotatably in the cylindrical member. The axial shaft has two free ends which pass through the two closed ends of the cylindrical member, respectively. Two spiral torsional springs are respectively mounted on the two closed ends of the cylindrical member. Each of the spiral torsional springs has a first end connected to one of the free ends of the axial shaft and a second end connected to one of the closed ends of the cylindrical member. A roll of cover cloth is wound on the cylinder and has a pull end passing through the axial slot of the cylindrical member. Two rollers are rotatably mounted on the two closed ends of the cylindrical member, respectively. A fastening device is provided for fastening the pull end of the cover cloth and the cylindrical member on an automobile.

7 Claims, 4 Drawing Sheets

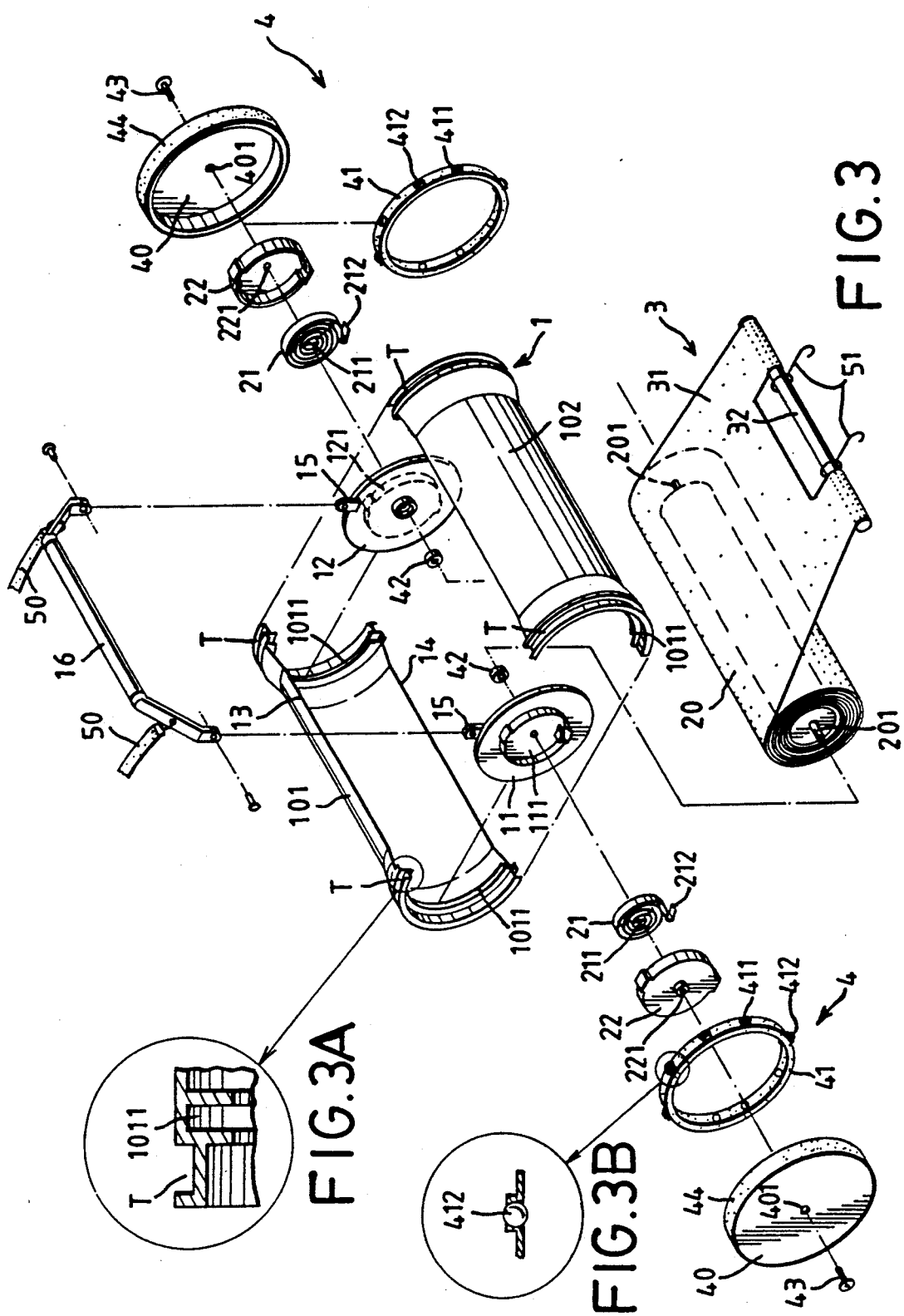

5,294,167

AUTOMOBILE COVERING DEVICE

BACKGROUND OF THE INVENTION

1. Field of the Invention

This invention relates to an automobile covering device, more particularly to an automobile covering device in which a cover cloth can be easily applied to the automobile.

2. Description of the Related Art

FIG. 1 shows a conventional automobile covering device which includes a base frame (A) having an automatically winding device (B) mounted rotatably therein. The automatically winding device (B) has a roll of cover cloth (D) wound thereon. A fastening device (C) includes a rope member, two hooks (C2) provided on the base frame (A) and a hook rod (C3) provided on a pull end of the cover cloth (D). In use, the rope member is tied on the trunk lid of the automobile, as illustrated in FIG. 2A. The rope member and the hooks (C2) are hooked on the rear bottom of the automobile, as illustrated in FIG. 2B. The cover cloth (D) is then pulled over the automobile from the rear to the front of the automobile in order to cover the automobile, as illustrated in FIGS. 2C and 2D. However, when the cover cloth (D) is pulled over the automobile, a great friction force between the cover cloth (D) and the external surface of the automobile is produced. Therefore, pulling the cover cloth is a relatively strenuous work. In addition, the paint on the external surface of the automobile is liable to be damaged when a user drags the cover cloth (D) in order to overcome said friction force.

SUMMARY OF THE INVENTION

It is therefore a main object of this invention to provide an automobile covering device which can be used to cover the automobile easily.

It is another object of this invention to provide an automobile covering device which will not damage the paint of the automobile.

Accordingly, the automobile covering device of this invention comprises:

a hollow cylindrical member having two closed ends, an axial slot and a water outlet formed therein;

a U-shaped handle having two ends connected pivotally to the two closed ends of the cylindrical member;

a cylinder with an axial shaft coaxially and received rotatably in the cylindrical member, the axial shaft having two free ends passing through the two closed ends of the cylindrical member, respectively;

two spiral torsional springs mounted respectively on the two closed ends of the cylindrical member, each of the spiral torsional springs having a first end connected to one of the free ends of the axial shaft and a second end connected to one of the closed ends of the cylindrical member;

two caps mounted detachably on the two closed ends of the cylindrical member so as to cover the spiral springs;

a roll of cover cloth wound on the cylinder, the cover cloth having a pull end passing through the axial slot of the cylindrical member;

two rollers mounted rotatably to the two closed ends of the cylindrical member, respectively; and a fastening means for fastening the pull end of the cover cloth and the cylindrical member on an automobile.

Other features and advantages of this invention will become apparent in the following detailed description of the preferred embodiment of this invention with reference to the accompanying drawings.

BRIEF DESCRIPTION OF THE DRAWINGS

FIG. 3 is a perspective exploded view of a preferred embodiment of an automobile covering device of this invention;

FIG. 3A is an enlarged plan view of the periphery of one of the closed ends of a hollow cylindrical member of this invention;

FIG. 3B is an enlarged plan view of a bearing mounted to the closed ends of the hollow cylindrical member of this invention;

DETAILED DESCRIPTION OF THE PREFERRED EMBODIMENT

Figure 1:
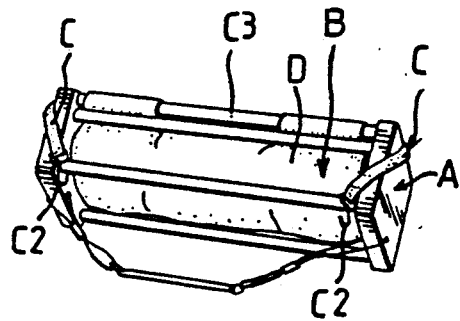
FIG. 1 is a perspective view of a conventional automobile covering device.
Figure 2A:
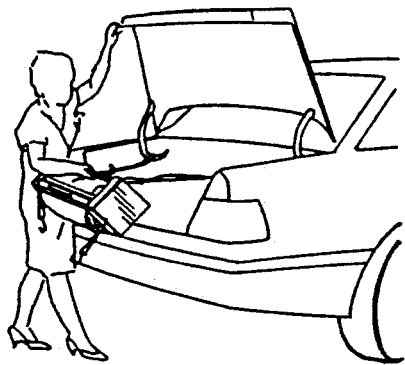
FIGS. 2A to 2D are perspective schematic views illustrating the conventional automobile covering device when in use.
Figure 2B:
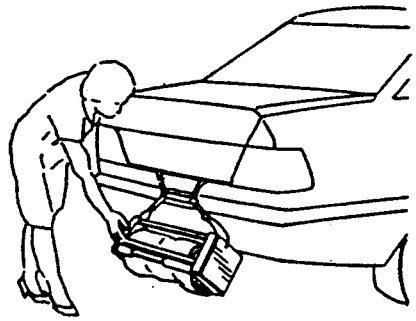
Figure 2C:
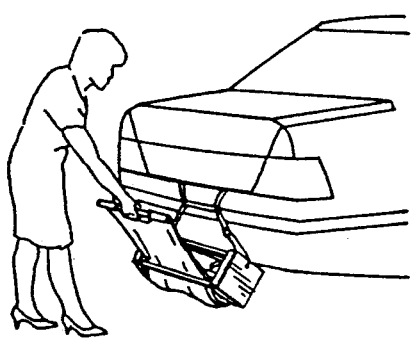
Figure 2D:
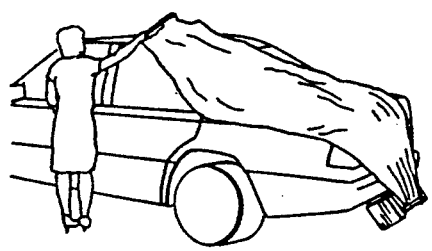
Figure 4:
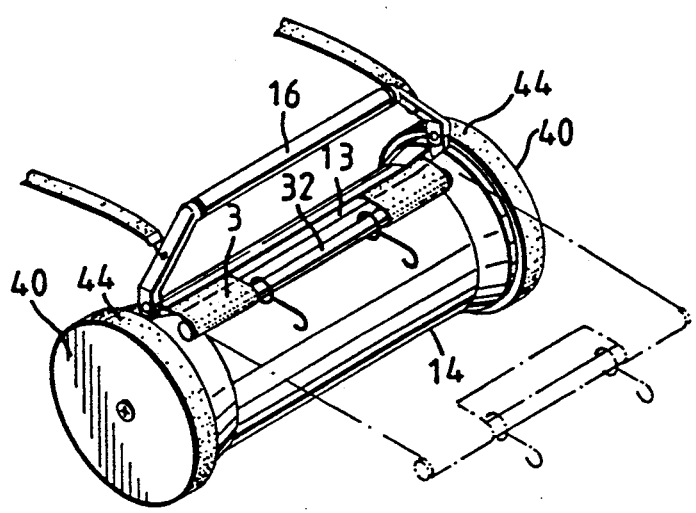
FIG. 4 is a perspective schematic view of the preferred embodiment of an automobile covering device of this invention when in use.

FIGS. 3 and 4 show a preferred embodiment of an automobile covering device of this invention. The automobile covering device includes a hollow cylindrical member 1 which is formed of two semi-cylindrical parts, 101 and 102, with two closed ends, 11 and 12. The two closed ends, 11 and 12, are fixed by internal end grooves 1011 of the two semi-cylindrical parts, 101 and 102. The hollow cylindrical member 1 has two external end grooves (T) formed after the two semi-cylindrical parts, 101 and 102, are combined, as best illustrated in FIG. 3A. An axial slot 13 and a water outlet 14 are formed oppositely in the cylindrical member 1, as shown in FIG. 4. The water outlet 14 allows rain water to flow out of the hollow cylindrical member 1. Two lugs 15 are respectively provided at the peripheries of the two closed ends, 11 and 12. A U-shaped handle 16 has two ends connected pivotally to the two lugs 15 of the cylindrical member 1. Two ring members, 111 and 112, are respectively formed on the external faces of the two closed ends, 11 and 12.

A cylinder 20 with an axial shaft 201 is received coaxially and rotatably in the cylindrical member 1. The axial shaft 201 has two free ends passing through the two closed ends, 11 and 12, of the cylindrical member 1, respectively. Two roll bearings 42 are respectively mounted between the two ends of the cylinder 20 and the free ends 201 of the two closed ends, 11 and 12, of the cylindrical member 1.

Two spiral torsional springs 21 are respectively received in the ring members, 111 and 121, of the two closed ends 11 and 12. Each of the spiral torsional springs 21 has a first end 211 connected to one of the free ends of the axial shaft 201 and a second end 212 connected to one of the ring members, 111 and 121, of the closed ends, 11 and 12, of the cylindrical member 1.

Two caps 22 are mounted detachably on the two ring members, 111 and 121, so as to cover the spiral springs 21. Each outside face of the caps 22 has a cylindrical projection 221 formed axially thereon. Each of the cylindrical projections 221 has an internal threaded hole formed therein.

A roll of cover cloth 3 is wound on the cylinder 20. The cover cloth 3 has a pull end 31 which passes through the axial slot 13 of the cylindrical member 1. A rod 32 is attached to the pull end 31 of the cover cloth 3. Therefore, the cover cloth 3 can be pulled out by means of pulling the rod 32 away from the cylindrical member 1, as best illustrated by the phantom lines in FIG. 4.

Two rollers 4 are mounted rotatably on the two closed ends, 11 and 12, of the cylindrical member 1, respectively. Each of the rollers 4 includes a wheel 40 and a bearing 41 mounted between the wheel 40 and one of the closed ends, 11 and 12, of the cylindrical member 1. The bearing 41 is a teflon ring having a plurality of rolling balls 412 provided therearound. Each of the wheels 40 has a cushion pad 44 provided therearound and a central hole 401 formed therein. The cylindrical projections 221 pass respectively through the central holes 401 of the wheels 40 and engage two threaded bolts 43 such that the wheels 40 can be rotated about the cylindrical projections 221 of the caps 22.

A rope member 50 is provided on the handle, 16 and two hook members are provided on the pull end 31 of the cover cloth 3 in order to fasten the pull end 31 of the cover cloth 3 and the cylindrical member 1 on the front and rear of an automobile.

Figure 5A:
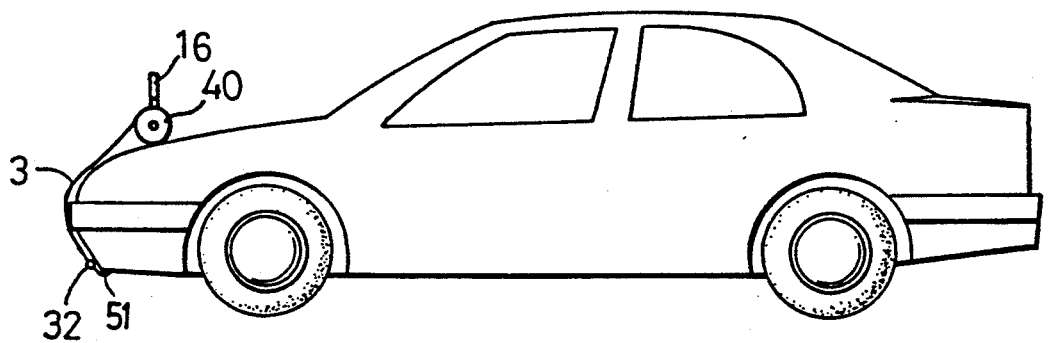
FIG. 5A to 5C are plan schematic views illustrating the automobile covering device of this invention when being used.
Figure 5B:
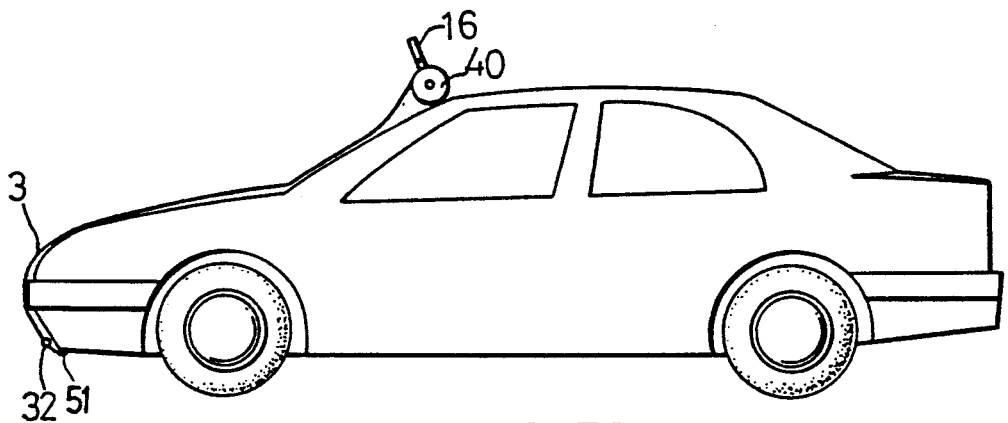
Figure 5C:
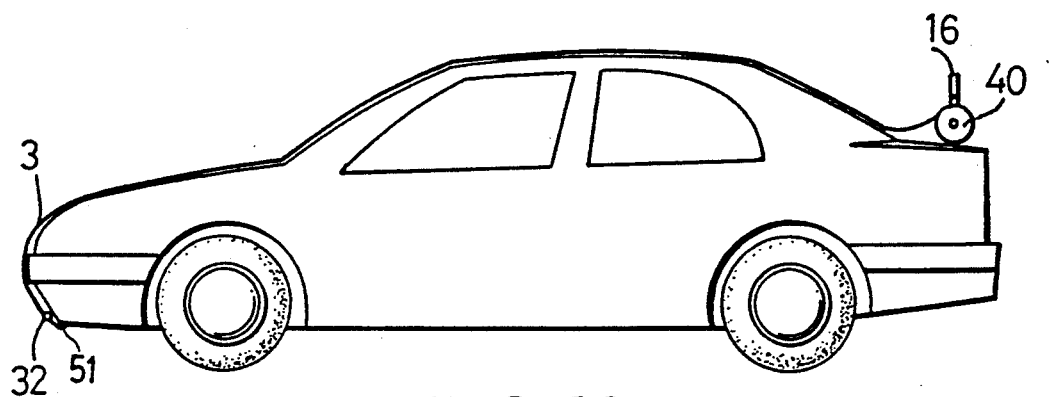

In use, the hook members 51 are first hooked on the front bottom of the automobile, as shown in FIG. 5A. The wheels 40 are disposed on the external surface of the automobile and are moved rearwardly from along the top portion of the automobile by carrying the handle 16 therealong, as best illustrated in FIGS. 5A and 5B. Therefore, the cover cloth 3 can be easily and rapidly applied to the automobile without applying a great pulling force. In addition, because the wheels 40 are provided with cushion pads 44, and because there is no relative movement of the cover cloth 3 and the external surface of the automobile, the baked paint of the automobile will not be damaged when the automobile covering device of this invention is moved along the automobile. In reverse, the cover cloth 3 may be rewound back into the cylindrical member 1 by means of the restoring force of the spiral torsional springs 21 when the automobile covering device is moved frontward in order to uncover the automobile.

With this invention thus explained, it is apparent that numerous modifications and variations can be made without departing from the scope and spirit of this invention. It is therefore intended that this invention be limited only as indicated in the appended claims.

I claim:

1. An automobile covering device comprising:
   a hollow cylindrical member having two closed ends, an axial slot and a water outlet formed therein;
   a U-shaped handle having two ends connected pivotally to said two closed ends of said cylindrical member;
   a cylinder with an axial shaft received coaxially and rotatably in said cylindrical member, said axial shaft having two free ends passing through said two closed ends of said cylindrical member, respectively;
   two spiral torsional springs mounted respectively on said two closed ends of said cylindrical member, each of said spiral torsional springs having a first end connected to one of said free ends of said axial shaft and a second end connected to one of said closed ends of said cylindrical member;
   two caps mounted detachably on said two closed ends of said cylindrical member so as to cover said spiral springs;
   a roll of cover cloth wound on said cylinder, said cover cloth having a pull end passing through said axial slot of said cylindrical member;
   two rollers mounted rotatably on said two closed ends of said cylindrical member, respectively; and
   means for fastening said pull end of said cover cloth and said cylindrical member on an automobile.

2. An automobile covering device as claimed in claim 1, wherein each of said rollers includes a wheel and a bearing mounted between said wheel and one of said closed ends of said cylindrical member.

3. An automobile covering device as claimed in claim 2, wherein said bearing is a teflon ring having a plurality of rolling balls provided therearound.

4. An automobile covering device as claimed in claim 1, further comprising two roll bearings mounted between said closed ends of said cylindrical member and said free ends of said axial shaft of said cylinder.

5. An automobile covering device as claimed in claim 4, wherein said cylindrical member is made of two semi-cylindrical parts.

6. An automobile covering device as claimed in claim 5, wherein said fastening means includes a rope member provided on said handle and two hook members provided on said pull end of said cover cloth.

7. An automobile covering device as claimed in claim 6, wherein each of said wheels has a cushion pad provided therearound.

* * * * *